Oct. 2, 1962

R. L. THORMAN ETAL 3,056,501

TRANSMISSION OIL FILTER ASSEMBLAGE

Filed Aug. 3, 1959

INVENTOR.
Richard L. Thorman
BY Richard J. Roberts

Hugh L. Fisher
ATTORNEY

Oct. 2, 1962     R. L. THORMAN ETAL     3,056,501
TRANSMISSION OIL FILTER ASSEMBLAGE
Filed Aug. 3, 1959     2 Sheets-Sheet 2
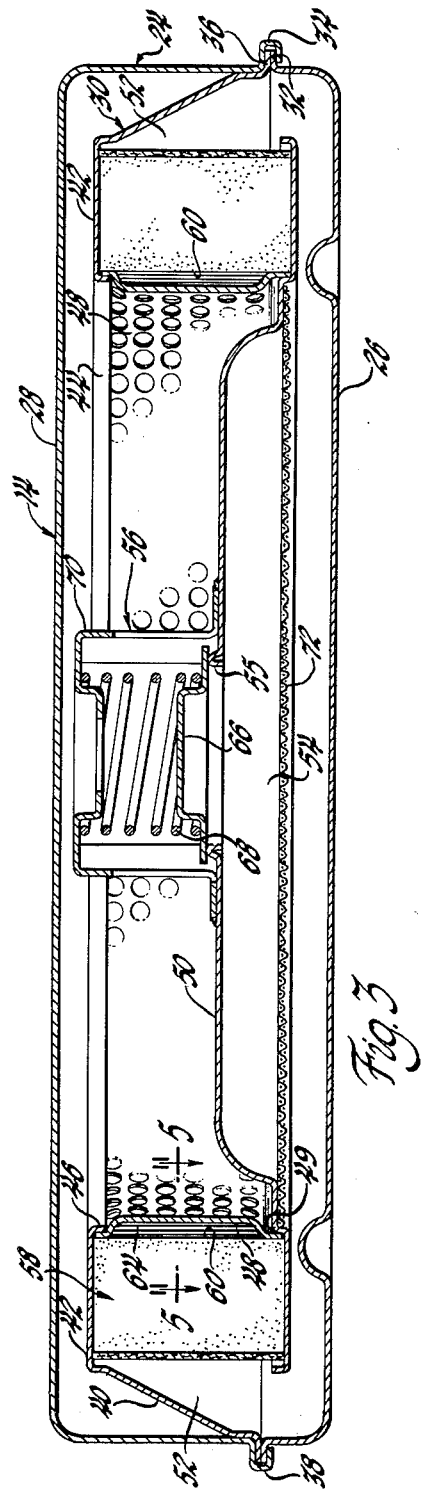
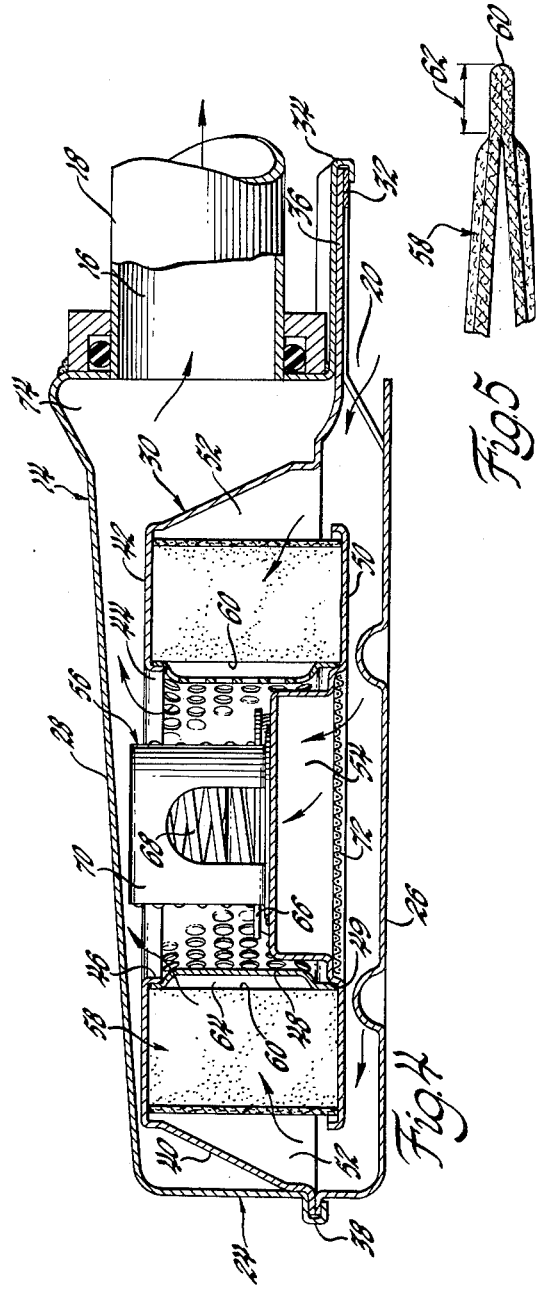
INVENTOR.
Richard L. Thorman
BY Richard J. Roberts
Hugh L. Fisher
ATTORNEY

United States Patent Office

3,056,501
Patented Oct. 2, 1962

3,056,501
TRANSMISSION OIL FILTER ASSEMBLAGE
Richard L. Thorman, Ypsilanti, and Richard J. Roberts, Flint, Mich., assignors to General Motors Corporation, Detroit, Mich., a corporation of Delaware
Filed Aug. 3, 1959, Ser. No. 831,198
3 Claims. (Cl. 210—132)

This invention relates generally to fluid filters and particularly to fluid filters of the type adapted, although not exclusively, for use with fluid pressure operated power transmissions.

With the type of automatic transmission that utilizes in some manner fluid pressure, there are advantages to having the fluid filtered, particularly in installations exposed to considerable dust and dirt. Additionally, although the operating conditions alone do not require a filter, extended use inherently produces foreign material due to the wear of components and it is this material that, e.g., can become lodged in a valve guideway surface and interfere with proper operation. Obviously, if dirt interferes with the operation of a shift valve or a pressure regulating valve, undesired consequences can result. Often a chain reaction of events takes place, damaging the transmission to an extent that substantial repairs are required.

Any filter unit for an automatic transmission, particularly for a vehicle transmission, must satisfy specifications normally not required of the usual filtering unit. For example, and for the reason mentioned, the filter unit must be "fail safe" so that damage to the transmission cannot occur in the event that a filter fails to operate for some reason. Along the same line, the filter unit should preferably be readily accessible and must afford filtering action adequate to protect the transmission components whether the fluid is cold or hot. Necessarily, because of space limitations, the filter unit must be small and compact without requiring alteration of existing road clearances while still affording a very substantial filter area. Despite this size requirement, there must not be any restrictions that could under certain conditions cause inadequate fluid to be supplied to the system or that require any greater amount of power for drawing the fluid from the sump through the filter. Also, consideration must be given to the desirability for having the filter on the suction side of the transmission pump so that all components in the fluid system including the pump are supplied filtered fluid.

Accordingly, the invention contemplates a fluid filter unit comprising both main and secondary filters uniquely arranged so that the secondary filter will either replace or supplement the main filter.

Further, the invention seeks to provide a fluid filter unit that is relatively small in size, is compact, and is so shaped that a substantial filter area is afforded; that by novel arrangement of flow passages and chambers, and by an unusual filter element construction, offers minimum resistance to fluid flow; that provides filtering under all conditions; and that is especially designed to protect the components thereof against malfunction.

More specifically, the invention affords a fluid filter unit especially adapted for protecting the fluid pressure control system of an automatic transmission. This fluid filter unit is arranged for disposition in the geometric center of the fluid reservoir so as to always have the inlet thereof immersed in the fluid and is of a minimum height so as to not interfere with existing road clearances. Also, the fluid filter is adapted for installation on the suction side of the pump and will furnish filtering action whether the fluid is hot or cold.

The foregoing and other objects and advantages of the invention will be apparent from the following description and from the following drawings in which:

FIGURE 1 demonstrates a fluid filtering unit incorporating the principles of the invention installed in a vehicle transmission;

FIGURE 3 is a sectional view of the filter unit taken along lines 3—3 of FIGURE 2;

FIGURE 4 is a sectional view of the filter unit taken along line 4—4 of FIGURE 2; and FIGURE 5 is an enlarged sectional view of a portion of a paper filter for the unit.

Figure 1:
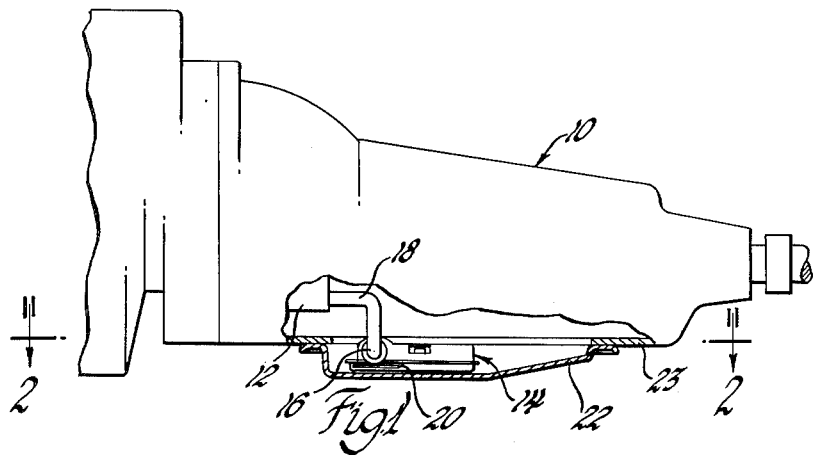

Referring now in detail to the drawings, the numeral 10 in FIGURE 1 denotes generally a vehicle transmission of a character employing a pump 12 for supplying fluid under pressure to the transmission control system. A fluid filter unit 14 has an exit 16 therefor sealingly joined by any appropriate means to the inlet side of the pump 12 by a suction pipe 18, and an entrance 20 thereto immersed in fluid in a reservoir 22 attached to the bottom of the transmission housing 23. Entrance 20 is so positioned relative to the reservoir 22 as to be immersed in the substantially geometric center thereof. Therefore, when the fluid level in the reservoir 22 changes for any reason, e.g., vibrations or tilting due to the terrain over which the vehicle is traveling, the chance that the entrance 20 will ever be above the fluid level and draw air is remote. If the pump 12 did draw air, the resultant foaming of the fluid would interfere with proper operation of the control system as well as reduce the lubricating ability of the fluid.

Figure 2:
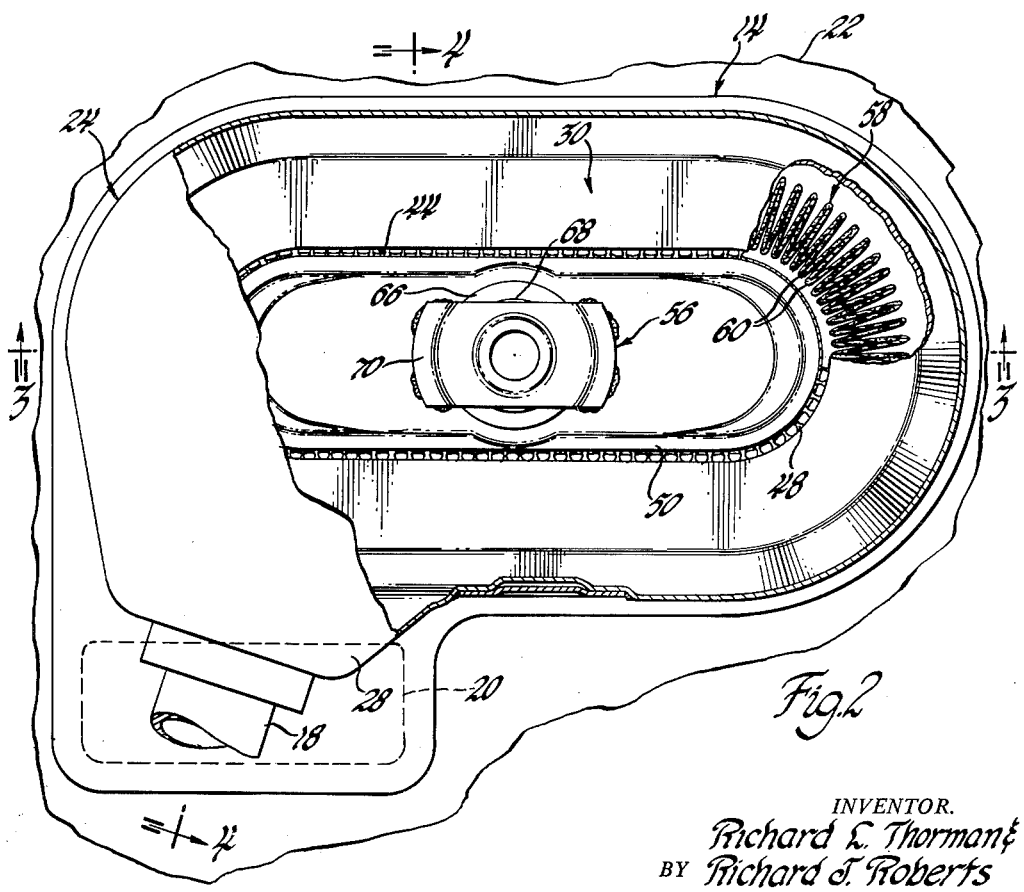
FIGURE 2 is a fragmentary sectional view of the filter unit looking in the direction of arrows 2—2 of FIGURE 1.

As is best displayed in FIGURES 2 and 3, the filter unit 14 has a relatively flat oval shaped filter housing 24 formed in two parts, one an inlet chamber or section is assigned the numeral 26 and the other, an outlet chamber or section is assigned the numeral 28. These two sections 26 and 28 are divided or separated by a partition 30 so as to afford the proper flow passages as will be explained. In fabricating the housing 24, sealing flanges 32 and 34, formed respectively on the inlet section 26 and the outlet section 28, are positioned on each side of a similar sealing flange 36 on the partition 30 and then these flanges are clamped together in sealing relation, for instance, by rolling over the edge 38 of the outlet section 28. If needed, and to further assure against leakage of air into the inside of the filter unit, suitable sealing material may be placed between the abutting edges of the flanges prior to or after the clamping operation. This will insure against the undesired aeration previously discussed.

To afford the necessary passageways within the filter unit 14, the partition 30 is so shaped as to have a tapered side wall 40 that as viewed extends inwardly and transversely of the partition sealing flange 36 and terminates in a support flange 42 that is substantially parallel to the sealing flange 36. The support flange 42 is in turn formed with an oval shaped opening 44, best shown in FIGURE 2, that is defined by an inturned edge 46 thereof. The inturned edge 46 additionally affords an abutting shoulder for the upper edge of a perforated retainer or filter element 48. The bottom edge of this perforated retainer 48 engages a similar shoulder 49 formed on the base element or plate 50 arranged below and parallel to the partition support flange 42. The base plate 50 is also oval shaped and partially closes the large opening in the inlet side of the partition 30 so as to form a main fluid passageway indicated generally at 52 extending between the housing inlet section 26 through the perforated retainer 48 and the oval shaped opening 44 in the partition 30 to the housing outlet section 28. This base plate 50 additionally furnishes a secondary fluid passageway denoted generally at 54 between the housing inlet and outlet sections 26 and 28 through a base plate opening 55 controlled by by-pass valve viewed at 56. Opening 55 and the by-pass valve 56, as depicted in FIGURE 2, are disposed within the areaway enclosed by the perforated retainer 48.

In the main passageway 52, a main filter 58 is positioned between the base plate 50 and the partition support flange 42 and adjacent the perforated retainer 48 so that fluid in the passageway 52 will have to pass therethrough. The main filter 58 is of suitable material, e.g., corrugated paper such being relatively inexpensive, formed in pleated fashion so as to have a series of folds (see FIGURE 2) for maximum filter area. This maximum filter area is further enhanced by the oval endless configuration, and also allows the filter housing 24 to be very shallow, i.e., the vertical height is of a minimum dimension such that the reservoir 22 need not be made any deeper and interfere with established road clearances. The filter 58 has the edges abutting the partition support flange 42 and the base plate 50 fixedly sealed therealong insuring against possibility of fluid passing through these edge vicinities without being filtered as well as forming a sub-assembly including the filter 58, the base plate 50, the retainer 48, and the partition 30.

Another desirable feature that may be incorporated in the main filter 58 is demonstrated in FIGURE 5. As viewed, the inside folded edges 60 of the filter 58 are compressed so as to flatten the corrugations in the paper outwardly from the edges 60 for an extent denoted at 62, which for exemplary purposes may be approximately one-eighth of an inch. This permits greater fluid passage in the vicinity of the edges 60 and thereby reduces the flow restriction in this area.

As can be seen in FIGURES 3 and 4, the perforated retainer 48 only abuts the main filter element inner edges 60 at the extreme ends thereof and is relieved or displaced inwardly therefrom a distance 64, e.g., and without limitation .090 of an inch. This is desirable since it causes the entire area of the filter 58 to be available for fluid flow and this flow can pass through the perforations in the retainer 48 relatively free of restriction. But, if the filter 58 is pressed or forced against the perforated retainer 48, the flow capacity of the filter 58 would be limited to the actual area exposed to the perforations in the retainer 48.

While discussing this relief 64 along the surface of the perforated retainer 48, it should be noted that the perforated retainer 48 also affords filtering since particles larger than the perforations therein cannot proceed therethrough. This is advantageous since it is not possible should the material of the filter 58 deteriorate for portions thereof to move into the suction pipe 18 for the pump 12, nor is it possible for any other large particles of foreign material passing through the ruptured or torn parts of the filter 58 to proceed through the retainer perforations.

From this explanation it can be seen that the retainer 48 both maintains the position of the main filter 58 in the main passageway 52, particularly when the main filter 58 is subjected to high pressures that tend to move the main filter 58 towards the outlet chamber 28, and affords some filtering against passage of large particles in the event the main filter 58 fails. Also, it should be mentioned that although the retainer 48 is shown as being made of perforated material, other equivalent materials may be used, e.g., a relatively coarse and rigid screen.

The by-pass valve 56 previously mentioned includes, as is best shown in FIGURE 3, a circular valve element 66 that is biased to the depicted closed position by a spring 68 housed within a valve cage 70. On the inlet side of the by-pass valve 66 a secondary filter as screen 72 is attached to the base plate 50 and will filter fluid proceeding through the secondary passageway 54 when this passageway becomes effective, in a manner to be explained in the operational summary. The bias of the spring 68 is such that a predetermined differential pressure must exist between the inlet and outlet sides of the by-pass valve 56 before the valve element 66 will move off its seat and to the open position. To insure that foreign material does not interfere with proper seating of the by-pass valve element 66, it will be noted that the inlet side of the by-pass valve is in a so-called scrub area and is continuously exposed to fluid flowing through the main passageway 52 when the by-pass valve 66 is closed. Also, the outlet side of the by-pass valve element 66 is in an areaway such that filtered fluid is always passing from the main passageway 52 in the proximity thereof, further insuring against interference in the operation of the by-pass valve by dirt or other foreign material.

To describe the operation of the filter unit 14, that ocurring normally will be first explained. With the pump 12 functioning, fluid will be drawn through the filter unit entrance 20 into the main fluid passageway 52. Also in going to the main passageway 52, this fluid will proceed by the inlet side of the by-pass valve element 66 and afford the scrubbing action mentioned. This fluid follows the path indicated by the arrows in FIGURE 4 and in proceeding along the main passageway 52 goes in sequence through the inlet section 26, the main filter 58, the perforations in the retainer 48, the opening 44 in the partition 30 and to the filter unit exit 16. Possible interference with flow in the vicinity of the exit 16 is avoided by having the area in this general vicinity noted at 74 considerably enlarged by increasing the height of the housing 24. The fluid filtered in this manner is then drawn through the suction pipe 18 and transferred by the pump 12 to the transmission control system.

If, during operation the main filter 58 should become clogged, or the fluid is very cold and resists flow, the by-pass valve 56 will become effective. With the filter 58 clogged or the fluid so sluggish as to be incapable of moving through the material of the main filter 58, the suction from the pump 12 will not be adequate to draw the fluid through the main filter 58, but it will be adequate to open the by-pass valve 54. Hence, fluid will flow past the screen 72 through the secondary passageway 56 and the valve element 66 to the housing exit 16. The screen 72 will preferably have a mesh size adequate to furnish filtering sufficient to protect the transmission against damage from most foreign material. Also, other type filters determined by the installation may be employed as a substitute for the screen 72.

From the foregoing it can be seen that the filter unit 14 has numerous desirable features. For instance, if the fluid is not proceeding through the main passageway 52 properly, the secondary passageway 54 will become effective through the operation of the by-pass valve 56 to either supplement or entirely replace the main passageway 52. In this manner, then, some filtering is always available. Also, by having the filter unit 14 on the suction side of the pump 12, the entire transmission system receives filtered fluid. Additionally, and as mentioned, the configuration of the filter unit 14 and the main filter unit 58 affords maximum filtering in a limited space without requiring extensive alterations of transmission dimensions so as to maintain minimum road clearances. The restrictions to flow in the unit 14 are greatly reduced by the relief 64 of the perforated retainer 48, the creasing of the filter element edges 60, and the enlargement 74 of the filter unit exit 16. The perforated retainer 48 additionally offers further filtering by insuring against passage of large particles of foreign material to the pump 12. The by-pass valve 56 is always kept free of foreign material, and hence, there is very little likelihood of this valve malfunctioning. Moreover, special precautions have been taken by locating the filter unit 14 in the geometric center of the reservoir 22 to insure against aeration of the fluid being filtered.

The invention is to be limited only by the following claims.

We claim:
1. In a fluid filter unit, the combination of a housing having inlet and outlet sections provided respectively with entrance and exit openings and sealing flanges; the outlet section having an enlarged area in the vicinity of the exit opening for facilitating fluid flow therethrough; a partition between the housing inlet and outlet sections; the partition having a tapered side wall, a sealing flange extending outwardly from the tapered side wall and defining a large oval shaped opening to the housing inlet section, the partition sealing flange being sealingly and fixedly disposed between the housing inlet and outlet section flanges, and a support flange extending inwardly from the tapered side wall and defining a small ovel shaped opening to the housing outlet section; a base element; a perforated filter element surrounding the partition small opening and disposed so as to have the edges thereof between the base element and the partition support flange; a paper filter positioned between and in sealing engagement with the base element and the partition support flange on the inlet side of the perforated filter element; the paper filter being of corrugated material and having a pleated configuration so formed as to afford a series of folds each flattened a predetermined extent from the end adjacent the perforated filter element thereby affording greater fluid passage therethrough; the perforataed filter element having only the edges engaging the filter so as to have the remaining area thereof displaced a predetermined distance from the paper filter and out of fluid restricting engagement therewith; the base element having a by-pass therein so arranged as to open into the area surrounded by the perforated filter element and permit direct communication between the housing inlet and outlet sections; a by-pass valve for closing the by-pass and so arranged as to open when a predetermined differential pressure exists between the housing inlet and outlet sections; and a screen positioned on the housing inlet section side of the by-pass valve so as to filter fluid passing through the by-pass when the by-pass valve is open, the fluid flowing through the screen from the inlet section proceeding to the outlet section only through the by-pass and only when the by-pass valve is open.

2. In a fluid filter unit, the combination of a housing having inlet and outlet sections provided respectively with entrance and exit openings and sealing flanges; a partition between the housing inlet and outlet sections, the partition having a tapered side wall, a sealing flange extending outwardly from the tapered side wall and defining a large oval shaped opening to the housing inlet section, the partition sealing flange being sealingly and fixedly disposed between the housing inlet and outlet section flanges, and a support flange extending inwardly from the tapered side wall and defining a small oval shaped opening to the housing outlet section; a base element; a perforated filter element surrounding the partition small opening and disposed so as to have the edges thereof between the base element and the partition support flange; a filter positioned between and in fixed sealing engagement with the base element and the partition support flange on the inlet side of the perforated filter element; the perforated filter element having only the edges engaging the filter so as to have the remaining area thereof displaced a predetermined distance from the filter and out of fluid restricting engagement therewith; the base element having a by-pass therein so arranged as to open into the area surrounded by the perforated filter element and permit direct communication between the housing inlet and outlet sections; a by-pass valve for closing the bypass and so arranged as to open when a predetermined differential pressure exists between the housing inlet and outlet sections; and a screen positioned on the housing inlet section side of the by-pass valve so as to filter fluid passing through the by-pass when the by-pass valve is open, the fluid flowing through the screen from the inlet section proceeding to the outlet section only through the by-pass and only when the by-pass valve is open.

3. In a fluid filter for a transmission having a pump arranged so as to draw fluid through the inlet thereof from a sump, the combination of a housing having inlet and outlet sections provided respectively with entrance and exit openings and sealing flanges; the inlet section entrance opening being arranged in substantially the geometric center of the sump; the outlet section exit being connected to the pump inlet; the outlet section also having an enlarged area in the vicinity of the exit opening for facilitating fluid flow therethrough; a partition between the housing inlet and outlet sections; the partition having a tapered side wall, a sealing flange extending outwardly from the tapered side wall and defining a large oval shaped opening to the housing inlet section, the partition sealing flange being sealingly and fixedly disposed between the housing inlet and outlet section flanges, and a support flange extending inwardly from the tapered side wall and defining a small oval shaped opening to the housing outlet section; a base element; a perforated filter retainer surrounding the partition small opening and disposed so as to have the edges thereof between the base element and the partition support flange; a paper filter positioned between and in fixed sealing engagement with the retainer base element and the partition support flange on the inlet side of the perforated filter retainer; the paper filter being of corrugated material and having a pleated configuration so formed as to afford a series of folds each flattened a predetermined extent from the end adjacent the perforated filter element thereby affording greater fluid passage therethrough; the perforated filter retainer having only the edges engaging the filter so as to have the remaining area thereof displaced a predetermined distance from the paper filter and out of fluid restricting engagement therewith; the base element having a by-pass therein so arranged as to open into the area surrounded by the perforated filter retainer and permit direct communication between the housing inlet and outlet sections; a by-pass valve for closing the by-pass and so arranged as to open when a predetermined differential pressure exists between the housing inlet and outlet sections; and a screen positioned on the housing inlet section side of the by-pass valve so as to filter fluid passing through the by-pass when the by-pass valve is open, the fluid flowing through the screen from the inlet section proceeding to the outlet section only through the by-pass and only when the by-pass valve is open.

References Cited in the file of this patent

UNITED STATES PATENTS

| | | |
|---|---|---|
| 2,108,798 | Dalrymple | Feb. 22, 1938 |
| 2,192,438 | Gulick | Mar. 5, 1940 |
| 2,285,997 | Mino | June 9, 1942 |
| 2,395,449 | Briggs | Feb. 26, 1946 |
| 2,448,212 | Dewey | Aug. 31, 1948 |
| 2,605,904 | Ogilvie | Aug. 5, 1952 |
| 2,617,535 | Hamilton | Nov. 11, 1952 |
| 2,663,425 | Haselwood | Dec. 22, 1953 |
| 2,743,018 | Belgarde | Apr. 24, 1956 |
| 2,782,934 | Maysilles | Feb. 26, 1957 |